(12) United States Patent
Marupaduga

(10) Patent No.: US 11,303,336 B1
(45) Date of Patent: Apr. 12, 2022

(54) DYNAMIC MODIFICATION OF BEAMFORMING WEIGHTS

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 96 days.

(21) Appl. No.: 16/926,329

(22) Filed: Jul. 10, 2020

(51) Int. Cl.
*H04B 7/06* (2006.01)
*H04W 28/02* (2009.01)

(52) U.S. Cl.
CPC ...... *H04B 7/0617* (2013.01); *H04W 28/0205* (2013.01); *H04W 28/0236* (2013.01)

(58) Field of Classification Search
CPC .. H04B 7/0613; H04B 7/0615; H04B 7/0617; H04W 28/02; H04W 28/0205; H04W 28/0231; H04W 28/0236
See application file for complete search history.

(56) References Cited

U.S. PATENT DOCUMENTS

| 2017/0005708 A1* | 1/2017 | Bhat | H04B 7/0617 |
| 2020/0366468 A1* | 11/2020 | Khandani | H04L 69/161 |
| 2021/0212146 A1* | 7/2021 | Stirling-Gallacher | H04B 7/088 |

* cited by examiner

*Primary Examiner* — Siu M Lee

(57) ABSTRACT

Dynamic beamforming in a telecommunications network in response to packet drops at a cell site router (CSR) is described. A measure of packet drops at a cell site router is determined. The measure of packet drops is compared to a threshold measure of acceptable packet drops and it is determined if the measure exceeds the threshold measure. Upon determining that the threshold measure is exceeded, one or more of a phase weight measure or an amplitude weight measure for a beam associated with an antenna or antenna array are modified such that there is a decrease in the number of user equipment (UEs) that are serviced by the associated antenna/antenna array.

20 Claims, 4 Drawing Sheets

DYNAMIC MODIFICATION OF BEAMFORMING WEIGHTS

SUMMARY

A high-level overview of various aspects of the technology described herein is provided as an overview of the disclosure and to introduce a selection of concepts that are further described below in the Detailed Description. This Summary is not intended to identify key features or essential features of the claimed subject matter, nor is it intended to be used as an aid in isolation to determine the scope of the claimed subject matter. The present technology is defined by the claims as supported by the Specification, including the Detailed Description and drawings.

Generally beamforming uses multiple antennas to control the direction of a wave-front by appropriately weighting the amplitude and phase of individual antenna signals. Beamforming is made possible by weighting the amplitude and/or phase of a signal broadcast at an individual antenna. Beamforming further may be made possible by weighting the tilt of the broadcast antenna. The present disclosure is directed, in part, to dynamically modifying beamforming weights (e.g., phase weights and/or amplitude weights) for antennas serving a communications network, substantially as shown in and/or described in connection with at least one of the figures, and as set forth more completely in the claims.

In certain respects, beamforming is utilized by a base station to communicate with user equipment (UE) in a cell or sector of one or more wireless networks. In a beamforming-enabled network, phase, power and amplitude values are applied to various lobes of a telecommunications antenna and/or antenna array such that the optimal broadcast beam(s) is created. However, historically, these weights have been applied based on an initial coverage analysis of the area served by the telecommunications antenna and there was no possibility to dynamically vary the phase, power, and/or amplitude values based on different radio frequency (RF) or network connection conditions. While this historic approach was sufficient to produce wireless telecommunications networks capable of providing service to a relatively small number of UEs, the historic approach no longer satisfies the needs of wireless telecommunications networks moving forward. Further, the components, modules, processors, programs, and computers used to facilitate this historic approach to telecommunications networks could not function in the various embodiments described herein. As such, some aspects of the present disclosure describe and are directed to methods, systems, devices, and computer-readable media that facilitate dynamic beamforming in telecommunications networks by incorporating previously unknown functions and configurations.

Aspects of the present disclosure are directed to dynamic optimization of a telecommunications network. Aspects of the present disclosure further are directed to dynamically altering the coverage footprint of at least one telecommunications antenna through beamforming by selecting and/or modifying the phase weight and/or amplitude weight of an antenna broadcast beam in response to packet drops occurring at a Cell Site Router (CSR) serving one or more radio access networks, such that at least one UE experience is, at least partially, optimized.

In one aspect of the disclosure, a method for dynamic beamforming based on CSR packet drops is provided. The method comprises determining (or receiving) a measure of packets dropped at a CSR associated with a base station, determining whether the measure of packets dropped at the CSR (equals or) exceeds a predetermined threshold measure and, based on the measure of packets dropped at the CSR (equaling or) exceeding the predetermined threshold measure, dynamically modifying a set of beamforming weights to alter the coverage footprint of a beam emitted by an antenna (or antenna array) serving the base station. In some aspects, the altered coverage footprint services fewer user devices (UEs) than the coverage footprint of the beam prior to modification of the set of beamforming weights.

In another aspect, the present technology provides one or more non-transitory computer-readable media having computer-executable instructions embodied thereon that, when executed, perform a method for dynamically modifying beamforms. In accordance with the media, the method performed comprises determining (or receiving) a measure of packets dropped at a CSR associated with a base station and determining that the measure (equals or) exceeds a predetermined threshold measure. The method performed further comprises, based on the measure (equaling or) exceeding the predetermined threshold measure, analyzing a first set of beamforming weights associated with a beam emitted by (an antenna or) an antenna array serving the base station and, based on the analyzing, determining how to modify at least one component (e.g., a phase weight or an amplitude weight) of the first set of beamforming weights such that the predetermined threshold measure of CSR packet drops is not (equaled or) exceeded. Still further, the method performed comprises dynamically modifying the at least one component of the first set of beamforming weights to produce a second set of beamforming weights, and applying the second set of beamforming weights to the (antenna or) antenna array to alter the coverage footprint of the emitted beam. In some aspects, the coverage footprint of the modified beam emitted by (the antenna or) the antenna array services fewer user devices (UEs) than the coverage footprint of the unmodified beam.

In yet another aspect, the present technology provides a system configured to dynamically modify beamforms based on CSR packet drops. The system comprises a base station and a beamforming manager. The base station is associated with a first radio access network (e.g., a 4G LTE network) and a second radio access network (e.g., a 5G NR network) and is configured for communicating with a quantity of user devices (UEs) using a beam emitted by (an antenna or) an antenna array associated with the base station. The beamforming manager is configured for determining (or receiving) a measure of packets dropped at a CSR associated with the base station, determining whether the measure of packets dropped at the CSR (equals or) exceeds a predetermined threshold measure and, based on the measure of packets dropped at the CSR (equaling or) exceeding the predetermined threshold measure, modifying the beam emitted by (the antenna or) the antenna array by dynamically modifying a set of beamforming weights (e.g., a phase weight and/or an amplitude weight) associated with (the antenna or) the antenna array to alter the coverage footprint of the emitted beam. In some aspects, the coverage footprint of the modified beam emitted by (the antenna or) the antenna array services fewer user devices (UEs) than the coverage footprint of the unmodified beam.

Additional objects, advantages, and novel features of the technology are described below in the Detailed Description. They will, in part, become apparent to those skilled in the art, or they may be learned by practice of the technology.

BRIEF DESCRIPTION OF THE DRAWINGS

Illustrative embodiments of the present invention are described in detail below with reference to the attached drawing figures, wherein.

DETAILED DESCRIPTION

The subject matter of the technology described herein is described with specificity to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In accordance with embodiments of the present technology, the coverage footprint of at least one telecommunications antenna (or antenna array) is dynamically altered through beamforming by modifying the phase and/or amplitude of an antenna (or antenna array) broadcast beam based on packet drops occurring at a Cell Site Router (CSR) serving one or more cell sites. In this way, at least one user device or equipment (UE) experience is, at least partially, optimized as service interruption due to packet dropping is reduced.

Figure 1:
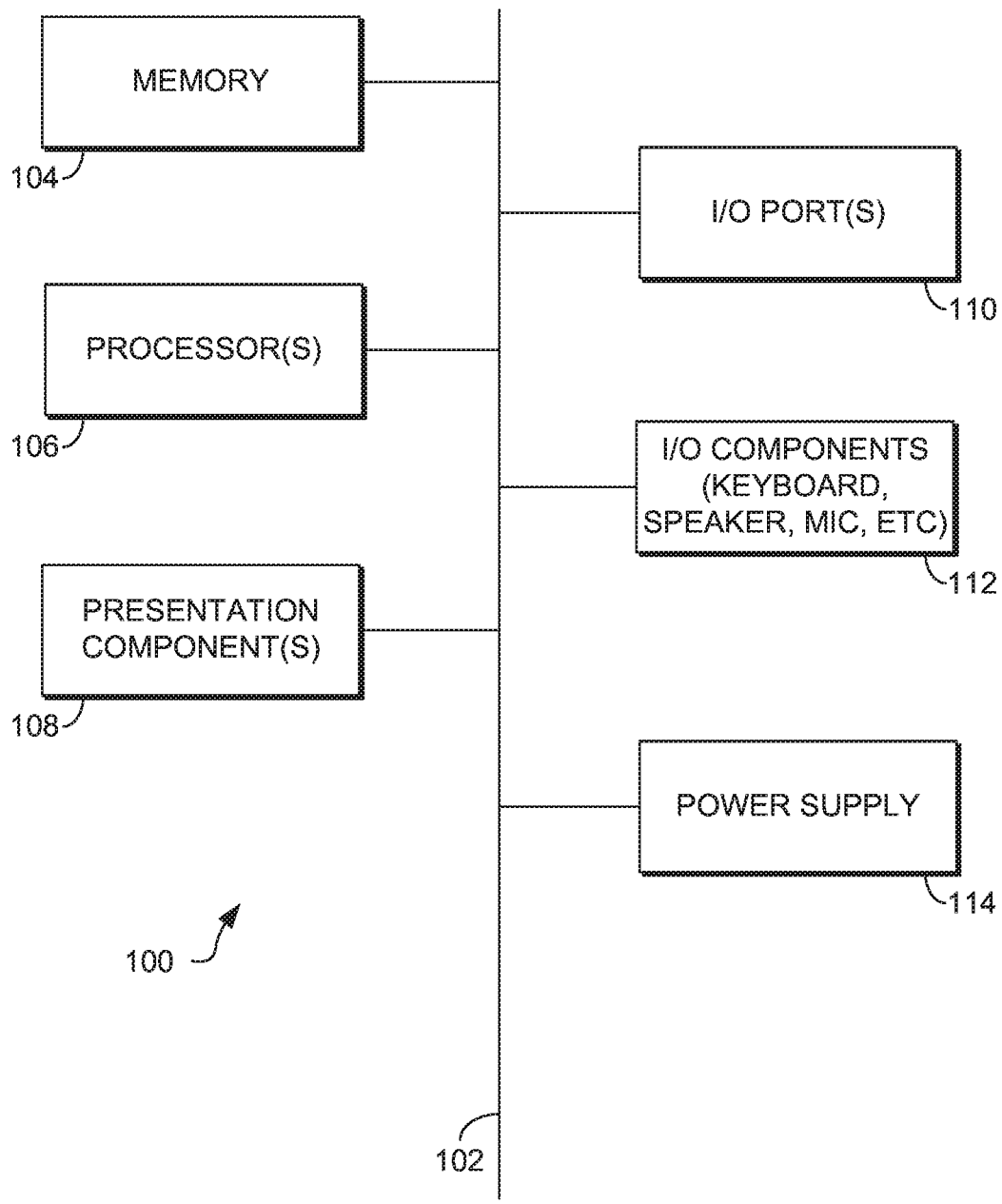
FIG. 1 is a schematic diagram depicting a computing device suitable for use in embodiments of the disclosed technology, in accordance with aspects described herein.

With reference now to FIG. 1, an exemplary computing device 100 suitable for use in implementing aspects of the technology is described below. The computing device 100 is merely an example of one suitable computing device and is not intended to suggest any limitation as to the scope of use or functionality of the technology. Neither should the computing device 100 be interpreted as having any dependency or requirement relating to any single component or combination of components illustrated therein.

As illustrated, the computing device 100 includes a bus 102 that directly or indirectly couples the following devices: a memory 104, one or more processors 106, one or more presentation components 108, one or more input/output (I/O) ports 110, one or more I/O components 112, and an illustrative power supply 114. The bus 102 represents what may be one or more busses, each being any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus. Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor hereof recognizes that such is the nature of the art and reiterates that the diagram of FIG. 1 is merely illustrative of an exemplary computing device that can be used in connection with one or more embodiments of the present technology. Distinction is not made between such categories as "workstation," "server," "laptop," "handheld device," etc., as all are contemplated within the scope of FIG. 1 and reference to "computing device."

The computing device 100 typically includes, or has access to, a variety of non-transitory computer-readable media. Computer-readable media can be any available media that may be accessed by the computing device 100 and includes volatile and nonvolatile media, as well as removable and non-removable media. By way of example, and not limitation, computer-readable media may comprise computer storage media and communication media. Computer storage media includes volatile, nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 100. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above also may be included within the scope of computer-readable media.

The memory 104 includes computer-storage media in the form of volatile and/or nonvolatile memory. The memory 104 may be removable, non-removable, or a combination thereof. Exemplary hardware devices include solid-state memory, hard drives, optical-disc drives, etc. The computing device 100 includes one or more processors 106 that read data from various entities such as the memory 104 or the I/O components 112, some of which may be built in. Illustrative I/O components include a speaker, a microphone, a keyboard, a joystick, a game pad, a satellite dish, a scanner, a printer, a wireless device, etc.

Figure 2:
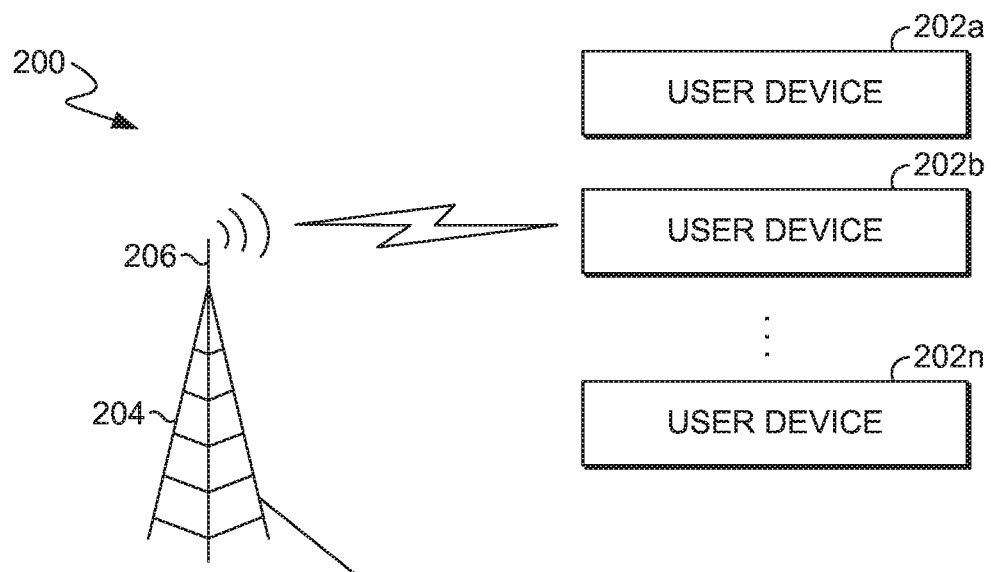
FIG. 2 is a schematic diagram depicting an exemplary system for use in embodiments of the disclosed technology, in accordance with aspects described herein.

Referring to FIG. 2, a network environment suitable for us in implementing embodiments of the present disclosure is provided. Such a network environment as illustrated in FIG. 2 is designated generally as network environment 200. The network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

As previously mentioned, embodiments of the present technology are directed to dynamically modifying beamforming weights within a network cell. In embodiments, a network cell may comprise a base station 204 to facilitate wireless communication between communication devices (e.g., user devices 202a, 202b . . . 202n) within the network cell and a network 220. As shown in FIG. 2, a communication device may be a user device 202a, 202b, and 202n. In the network environment 200, the user device 202a (as well as user devices 202b and 202n) may communicate with other devices, such as mobile devices, servers, etc. The user device 202a may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 204 in order to interact with a network 220, which may be a public or a private network. Makers of illustrated devices include, by way of example only, Research in Motion, Creative Technologies Corp., Samsung, Apple computers, Nokia, Motorola, and the like.

In some aspects, the user device 202a is the type of device described herein with respect to FIG. 1. In some implementations, the user device 202a comprises a wireless or mobile device with which a wireless telecommunication network(s) may be utilized for communication (e.g., voice and/or data communication). In this regard, the user device 202a may be any mobile computing device that communicates by way of a wireless network, for example, a 3G, 4G, 5G, LTE, CDMA, or any other type of network. In embodiments, the network environment 200 further may comprise a plurality of user devices substantially similar to the user device 202a.

The user device 202a may utilize a network 220 to communicate with other computing devices, such as user devices 202b and 202n (e.g., a mobile device(s), a server(s), a personal computer(s), etc.). In embodiments, the network 220 is a telecommunications network, or a portion thereof. A telecommunications network might include an array of devices or components, some of which are not shown so as to not obscure more relevant aspects of the present technology. Components such as terminals, links, and nodes (as well as other components) may provide connectivity in some embodiments. The network 220 may include multiple networks, as well as being a network of networks, but is shown in more simple form so as to not obscure other aspects of the present disclosure. The network 220 may be part of a telecommunications network that connects subscribers to their immediate service provider. In embodiments, the network 220 is associated with a telecommunications provider that provides services to user devices, such as the user device 202a. For example, the network 220 may provide voice services to user devices or corresponding users that are registered or subscribed to utilize the services provided by a telecommunications provider. The network 220 can be any communication network providing voice and/or data service(s), such as, for example, a 1× circuit voice, a 3G network (e.g., CDMA, CDMA 1000, WCDMA, GSM, UMTS), a 4G network (e.g., WiMAX, LTE, HSDPA), a 5G network (e.g., 5G NR), or the like.

The network environment 200 also may include a database (not shown). The database can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

Figure 3:
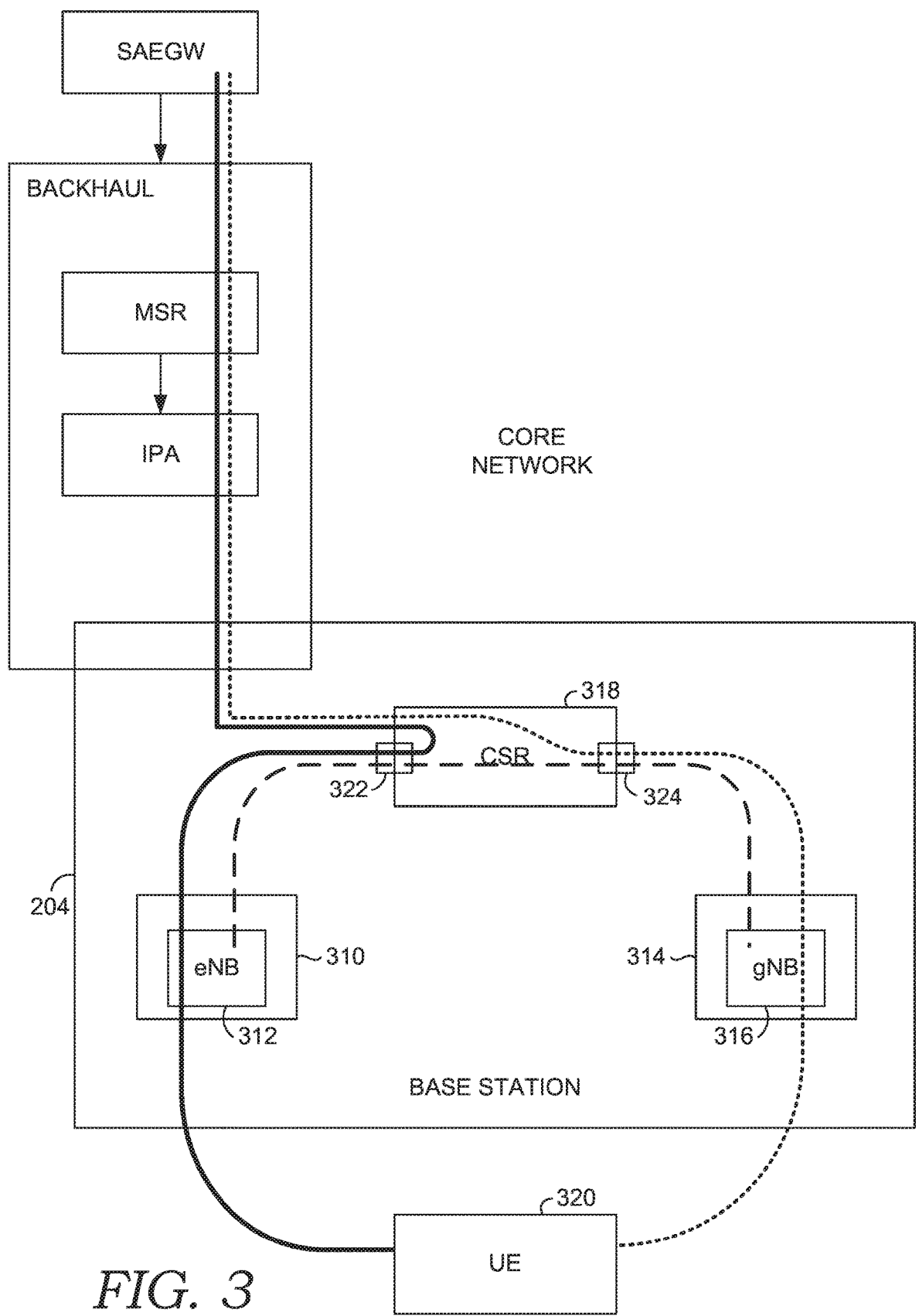
FIG. 3 is a schematic diagram depicting an exemplary base station for use in embodiments of the disclosed technology, in accordance with aspects described herein.

As previously mentioned, the user device 202a may communicate with other devices by using a base station, such as base station 204. In embodiments, the base station 204 is a wireless communications station 204 that is installed at a fixed location, such as a telecommunication tower, as illustrated in FIG. 2. The telecommunication tower may be a tall structure designed to support one or more antennas 206 for telecommunications and/or broadcasting. In other embodiments, the base station 204 is a mobile base station (e.g., small cell). A more detailed view of the base station 204 is shown in the schematic diagram of FIG. 3. As illustrated, the base station 204 comprises a 4G LTE radio access network 310 having an eNodeB 312, a 5G NR radio access network 314 having a gNodeB 316, and a cell site router (CSR) 318, and is used to facilitate communication with and between user equipment (UEs) 320 as part of the wireless communications network. In this way, the base station 204 can facilitate wireless communications between the user devices 202a and 202b through 202n, and the network 220.

The base station 204 may include at least one baseband unit (BBU) (not shown) responsible for, among other things, digital baseband signal processing. For instance, CDMA/EVDO, LTE and 5G NR Internet Protocol (IP) packets are received from a wireless communications network and are digitally combined by the BBU at the base station 204. The blended digital baseband signal then may be transmitted to a radio at the base station 204. Digital baseband signals received from the radio are demodulated by the BBU and the resulting IP packets then are transmitted by the BBU to the network 220. The base station 204 also may include or be associated with an LTE System Manager (LSM) configured to manage a master list (e.g., a table) of beamforming weights. The list of beamforming weights may include a plurality of beamforming weights applicable to a plurality of antennas, antenna model numbers, down tilt angles of antennas, and the like. This listing also may include beamforming weights applicable to beamforming configurations, such as full-power broadcast beamforming and non-full-power broadcast beamforming, including tapered beamforming. This listing also may include acceptable threshold measures (e.g., quantities, percentages, ratios, or the like) for packet drops at an associated cell site router (CSR) (e.g., the CSR 318 shown in FIG. 3).

As stated, the base station 204 may include one or more radio(s) (not shown) or remote radio head(s) (RRH) that generally communicate with one or more antennas 206 associated with the base station 204. In some embodiments, the one or more antennas may comprise at least one antenna and/or antenna array. In this regard, the radio is used to transmit signals or data to an antenna 206 associated with the base station 204 and receive signals or data from the antenna 206. Communications between the radio and the antenna 206 can occur using any number of physical paths. A physical path, as used herein, refers to a path used for transmitting signals or data. As such, a physical path may be referred to as a radio frequency (RF) path, a coaxial cable path, a cable path, or the like.

The antenna 206 is used for telecommunications. Generally, the antenna 206 may be an electrical device that converts electric power into radio waves and converts radio waves into electric power. The antenna 206 typically is positioned at or near the top of the telecommunication tower as illustrated in FIG. 2. Such an installation location, however, is not intended to limit the scope of embodiments of the present technology. In some embodiments, the antenna 206 may be a single antenna, at least one antenna, and/or a plurality of antennas. In some embodiments, the antenna 206 may be a single antenna array, at least one antenna array, and/or a plurality of antenna arrays. The radio(s) associated with the base station 204 may include at least one transceiver configured to receive and transmit signals or data. For example, the radio may transmit and receive wireless RF signals and convert the blended digital signal received from the BBU into an analog RF output via a digital-to-analog (AD) converter. The analog signal then may be amplified by an amplifier in the radio and sent out for transmission to a remote communications device, such as the user device 202. The RF signals received from the remote communications device, such as the user device 202, are amplified by the radio and converted to digital baseband signals for transmission to the BBU.

The antenna 206 of FIG. 2 may be configured to support multiple-input-multiple-output (MIMO) and beamforming transmission modes. In embodiments, the antenna 206 may rely on a MIMO transmission mode when the user device 202*a* is located near the radio tower and may rely on a beamforming transmission mode when the user device 202*a* is located on the periphery of a coverage area.

Continuing, the network environment 200 further may include a beamforming manager 210. The beamforming manager 210 may be configured to, among other things, select and/or modify the weights of an antenna (or antenna array) broadcast beam, in accordance with the present disclosure. The beamforming manager 210 may comprise a server having one or more processors. Though the beamforming manager 210 is illustrated separately in FIG. 2, it may be a component of the base station 204. In some embodiments, the beamforming manager 210 may be a component of the 4G radio access network 310 and/or the 5G NR radio access network 314. In other embodiments, the beamforming manager 210 may be remotely located.

As mentioned, the beamforming manager 210 may select and/or modify beamform phase and/or amplitude weights for the antenna broadcast beam(s) at one or more antennas or antenna arrays associated with one or more base stations, such as the base station 204. The beamforming manager 210 may include, among other things, a receiving component 212, a determining component 214, an analyzing component 216 and a weighting component 218.

The receiving component 212 may receive network configuration information such as current broadcast mode (e.g., full power mode, tapered beam mode, beamform mode, and the like) and beamform phase and amplitude weights values associated with the one or more antennas and/or antenna arrays. The receiving component 212 further may receive measures of packet drops at a cell site router (CSR) associated with a base station, for instance, the CSR 318 associated with the base station 204 of FIG. 3. In some embodiments, for instance, the embodiment illustrated in FIG. 3 wherein the base station 204 comprises a 4G radio access network 310 and a 5G radio access network 312, the receiving component 212 may receive a measure of packets dropped at a 4G port 322 of the CSR and/or a measure of packets dropped at a 5G port 324 of the CSR.

The determining component 214 may monitor and analyze, at least, network configuration information and beamform phase and amplitude weights values associated with antenna(s), and/or antenna array(s), for instance, the antenna 206 of FIG. 2. Further, the determining component 214 may determine, among other things, a measure (e.g., a quantity, a ratio, a percentage, or the like) of packets dropped at a cell site router (CSR) associated with a base station, for instance, the CSR 318 associated with the base station 204 of FIG. 3. For instance, the determining component 214 of the beamforming manager 210 may determine a measure of packets dropped at a CSR by combining a measure of packets dropped at a 4G port of a CSR (e.g., the 4G port 322 of the CSR 318 of FIG. 3) and a measure of packets dropped at a 5G port of a CSR (e.g., the 5G port 324 of the CSR 318 of FIG. 3).

In some embodiments, the determining component 214 may comprise a historical database (not shown) of network configuration information, beamform phase and amplitude weights, and/or measures of packet drops at a CSR associated with a base station and/or may be communicatively coupled to a database (not shown) storing, at least temporarily, network configuration information, beamform phase and amplitude weights, and/or packet drop measures. In some embodiments, the database may receive network configuration information, beamform phase and amplitude weights associated with a plurality, two or more, and/or one antenna or antenna array. In some embodiments, the database may receive packet drop measures associated with a plurality, two or more, and/or one base station.

The analyzing component 216 may compare one or more of the monitored network configuration information, beamform phase and amplitude weights values, and/or measures of packets dropped at a CSR with one or more threshold values to determine whether the threshold values are exceeded. In some embodiments, the threshold(s) may be based, at least in part, on the historical database of network configuration information, beamform phase and amplitude weights values, and/or measures of packets dropped at CSRs. In embodiments, the analyzing component 216 further may determine, based on a measure of packets dropped at the CSR equaling or exceeding a threshold measure, whether and how to dynamically modify the beamform phase and/or amplitude weights of an antenna, such as the antenna 206.

The weighting component 218 may generate beamforming phase and amplitude weights and apply the beamforming weights to an antenna, such as antenna 206. In some embodiments, the weighting component 218 generates the beamforming weights upon activation by the analyzing component 216. Further, in some embodiments, the weighting component 218 may detect the current transmission mode and/or beamforming weights currently used by an antenna, such as the antenna 206. In some embodiments, generation of the beamforming weights by the weighting component 218 may comprise selection of a set of beamforming weights from a predetermined list of potential beamforming weights. In an embodiment, the list of potential beamforming weights may be based on beamforming weights applied to a similar antenna and/or antenna array in a testing environment. Additionally and/or alternatively, in some embodiments generation of the beamforming weights may comprise utilizing machine learning models for optimized beamforming based on theoretical and/or historical antenna and/or antenna array performance data.

Figure 4:
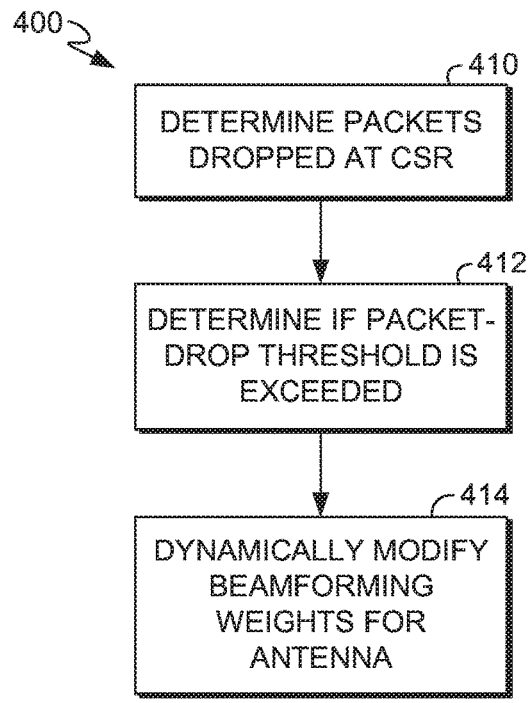
FIG. 4 is a flow diagram depicting an exemplary method 400 for dynamic beamforming based on packet drops, in accordance with aspects described herein.

With reference to FIG. 4, illustrated is a flow diagram depicting an exemplary method 400 for dynamic beamforming based on CSR packet drops, in accordance with aspects described herein. As indicated at block 410, a measure of packets dropped at a cell site router (CSR) (e.g., CSR 318 of FIG. 3) associated with a base station (e.g., base station 204 of FIGS. 2 and 3) is determined, for instance, by the determining component 214 of the beamforming manager 210 of FIG. 2. In some embodiments, rather than determining a measure of packets dropped at a CSR, a measure of packet drops may be received, for instance from a CSR (e.g., CSR 318 of FIG. 3), by, for instance, the receiving component 212 of the beamforming manager 210 of FIG. 2. Any and all such variations, and any combination thereof, are contemplated to be within the scope of embodiments of the present technology.

As indicated at block 412, it is determined (e.g., utilizing the determining component 214 of the beamforming manager 210 of FIG. 2) whether the measure of packets dropped at the CSR equals or exceeds a predetermined threshold measure. The predetermined threshold measure, as set forth herein above, may be predetermined based upon any number of factors including, without limitation, historical network performance and/or current network performance measures. It will be understood by those having ordinary skill in the relevant art that the terms "exceed," "exceeds," "exceeding," and the like, as utilized herein, are intended to encompass embodiments where measures and/or values are received/determined that are equivalent to threshold measures and/or values, as well as those that exceed such threshold measures and/or values if and when the threshold measures are defined as such.

As indicated at block 414, based on the determined measure of packets dropped at the CSR exceeding the predetermined threshold measure, a set of beamforming weights is dynamically modified (e.g., utilizing the weighting component 218 of the beamforming manager 210 of FIG. 2) such that a coverage footprint of a beam emitted by an antenna or antenna array (e.g., the antenna 206 of FIG. 2) associated with the base station (e.g., the base station 204 of FIGS. 2 and 3) is altered. In some aspects, the altered coverage footprint services fewer user devices (e.g., UEs 202a, 202b . . . 202n) than the coverage footprint of the beam prior to modification of the set of beamforming weights.

Figure 5:
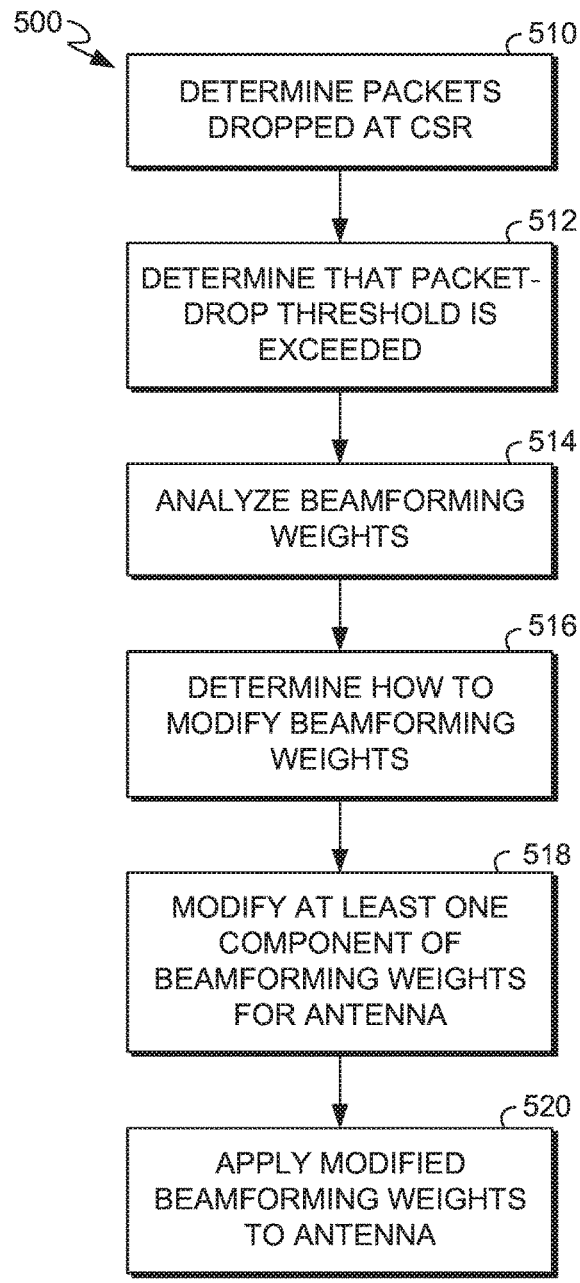
FIG. 5 a flow diagram depicting an exemplary method 500 for dynamically modifying beamforms, in accordance with aspects described herein.

Turning to FIG. 5, illustrated is a flow diagram depicting an exemplary method 500 for dynamically modifying beamforms, in accordance with aspects described herein. As indicated at block 510, a measure of packets dropped at a cell site router (CSR) (e.g., CSR 318 of FIG. 3) associated with a base station (e.g., base station 204 of FIGS. 2 and 3) is determined (e.g., by the determining component 214 of the beamforming manager 210 of FIG. 2). In some embodiments, rather than determining a measure of packets dropped at a CSR, a measure of packet drops may be received, for instance from a CSR (e.g., CSR 318 of FIG. 3), by, for instance, the receiving component 212 of the beamforming manager 210 of FIG. 2. Any and all such variations, and any combination thereof, are contemplated to be within the scope of embodiments of the present technology.

As indicated at block 512, it is determined (e.g., by the determining component 214 of the beamforming manager 210 of FIG. 2) that the measure exceeds a predetermined threshold measure. The predetermined threshold measure, as set forth herein above, may be predetermined based upon any number of factors including, without limitation, historical network performance and/or current network performance measures.

Based on the determined measure of packets dropped at the CSR exceeding the predetermined threshold measure, and as indicated at block 514, a first set of beamforming weights associated with a beam emitted by an (antenna or) antenna array associated with the base station is analyzed, for instance, by the analyzing component 216 of the beamforming manager 210 of FIG. 2. As indicated at block 516, based on the analyzing, it is determined (e.g., by the determining component 214 of the beamforming manager 210 of FIG. 2) how to modify at least one component of the first set of beamforming weights such that a coverage footprint of a beam emitted by an antenna or antenna array (e.g., the antenna 206 of FIG. 2) associated with the base station (e.g., the base station 204 of FIGS. 2 and 3) is altered.

As indicated at block 518, the at least one component of the first set of beamforming weights is dynamically modified (e.g., utilizing the weighting component 218 of the beamforming manager 210 of FIG. 2) to produce a second set of beamforming weights. As indicated at block 520, the second set of beamforming weights is applied (e.g., utilizing the weighting component 218 of the beamforming manager 210 of FIG. 2) to the (antenna or) antenna array to alter the emitted beam. In some aspects, the coverage footprint of the altered beam emitted by (the antenna or) the antenna array services fewer user devices (e.g., UEs 202a, 202b . . . 202n) than the coverage footprint of the unaltered beam.

From the foregoing, it will be seen that the disclosed technology is one well adapted to attain all the ends and objects described, together with other advantages which are obvious and inherent to the structure. It will be understood that certain features and sub-combinations are of utility and may be employed without reference to other features and sub-combinations. This is contemplated by and is within the scope of the claims. Since many possible embodiments may be made of the present technology without departing from the scope, it is to be understood that all matter described or shown in the accompanying drawings is to be interpreted as illustrative and not in a limiting sense.

What is claimed is:

1. A method of dynamic beamforming based on packet drops, the method comprising:
determining a measure of packets dropped at a cell site router (CSR) associated with a base station;
determining whether the measure of packets dropped at the CSR exceeds a predetermined threshold measure; and
based on the measure of packets dropped at the CSR exceeding the predetermined threshold measure, dynamically modifying a set of beamforming weights to modify a beam emitted by an antenna serving the base station.

2. The method of claim 1, further comprising analyzing the set of beamforming weights, wherein dynamically altering the set of beamforming weights to modify the beam emitted by the antenna comprises, based on the analyzing, determining how to modify at least one component of the set of beamforming weights.

3. The method of claim 2, wherein dynamically altering the set of beamforming weights comprises modifying the at least one component of the set of beamforming weights to produce a second set of beamforming weights, and wherein the method further comprises dynamically applying the second set of beamforming weights to the antenna.

4. The method of claim 3, wherein dynamically applying the second set of beamforming weights to the antenna causes a decrease in the quantity of user devices communicating using the beam emitted by the antenna associated with the base station.

5. The method of claim 1,
wherein the base station comprises a first radio access network having an eNodeB with an associated first CSR port and a second radio access network having a gNodeB with an associated second CSR port,
wherein the eNodeB is configured to determine a first measure of packets dropped at the first CSR port and the gNodeB is configured to determine a second measure of packets dropped at the second CSR port,
and wherein the measure of packets dropped at the CSR comprises a combination of the first measure and the second measure.

6. The method of claim 5, wherein determining the measure of packets dropped at the CSR comprises, at the eNodeB:
determining the first measure of packets dropped at the first CSR port;
requesting the second measure of packets dropped at the second CSR port from the gNodeB;
receiving the second measure of packets dropped at the second CSR port from the gNodeB; and
combining the first measure and the second measure.

7. The method of claim 2, wherein the at least one component of the set of beamforming weights comprises a phase weight.

8. The method of claim 2, wherein the at least one component of the set of beamforming weights comprises an amplitude weight.

9. One or more non-transitory computer-readable media having computer-executable instructions embodied thereon that, when executed, perform a method for dynamically modifying beamforms, the method comprising:
determining a measure of packets dropped at a cell site router (CSR) associated with a base station;
determining that the measure exceeds a predetermined threshold measure;
based on the measure exceeding the predetermined threshold measure, analyzing a first set of beamforming weights associated with a beam emitted by an antenna array associated with the base station;
based on the analyzing, determining how to modify at least one component of the first set of beamforming weights;
dynamically modifying the at least one component of the first set of beamforming weights to produce a second set of beamforming weights; and
applying the second set of beamforming weights to the antenna array to modify the emitted beam.

10. The media of claim 9, wherein applying the second set of beamforming weights to the antenna array causes a decrease in the quantity of user devices communicating using the beam emitted by the antenna array associated with the base station.

11. The media of claim 9,
wherein the base station comprises a first radio access network having an eNodeB and an associated first CSR port and a second radio access network having a gNodeB and an associated second CSR port,
wherein the eNodeB is configured to determine a first measure of packets dropped at the first CSR port and the gNodeB is configured to determine a second measure of packets dropped at the second CSR port,
and wherein the measure of packets dropped at the CSR comprises a combination of the first measure and the second measure.

12. The media of claim 11, wherein determining the measure of packets dropped at the CSR comprises, at the eNodeB:
determining the first measure of packets dropped at the first CSR port;
requesting the second measure of packets dropped at the second CSR port from the gNodeB;
receiving the second measure of packets dropped at the second CSR port from the gNodeB; and
combining the first measure and the second measure.

13. The media of claim 9, wherein the at least one component of the first set of beamforming weights comprises a phase weight.

14. The media of claim 9, wherein the at least one component of the first set of beamforming weights comprises an amplitude weight.

15. A system configured to dynamically modify beamforms based on packet drops, the system comprising:
a base station, wherein the base station is associated with a first radio access network and a second radio access network, and wherein the first base station is configured for communicating with a quantity of user devices using the beam emitted by an antenna array associated with the base station; and
a beamforming manager configured for:
determining a measure of packets dropped at a cell site router (CSR) associated with the base station;
determining whether the measure of packets dropped at the CSR exceeds a predetermined threshold measure; and
based on the measure of packets dropped at the CSR exceeding the predetermined threshold measure, modifying the beam emitted by the antenna array by dynamically modifying a set of beamforming weights associated with the antenna array.

16. The system of claim 15, wherein the beamforming manger is further configured for:
analyzing the set of beamforming weights; and
based on the analyzing, determining how to modify at least one component of the set of beamforming weights.

17. The system of claim 16, wherein dynamically modifying the set of beamforming weights comprises dynamically modifying the at least one component of the set of beamforming weights to produce a second set of beamforming weights, and wherein the beamforming manager further is configured for dynamically applying the second set of beamforming weights to the antenna array.

18. The system of claim 17, wherein when the beamforming manager dynamically applies the second set of beamforming weights to the antenna array, a decrease is caused in the quantity of user devices communicating using the beam emitted by the antenna array.

19. The system of claim 16, wherein the at least one component of the set of beamforming weights comprises one of a phase weight and an amplitude weight.

20. The system of claim 15, wherein the first radio access network comprises a 4G LTE network having an eNodeB and an associated first CSR port, wherein the second radio access network is a 5G NR network having a gNodeB and an associated second CSR port, wherein the eNodeB is configured to determine a first measure of packets dropped at the first CSR port and the gNodeB is configured to determine a second measure of packets dropped at the second CSR port, and wherein the measure of packets dropped at the CSR comprises a combination of the first measure and the second measure.

* * * * *